United States Patent [19]

Lissaman et al.

[11] Patent Number: 5,070,955
[45] Date of Patent: Dec. 10, 1991

[54] PASSIVELY STABLE HOVERING SYSTEM

[75] Inventors: Peter B. S. Lissaman, Altadena; Herman M. Drees, Semi Valley; Charles J. Sink, Simi Valley; William D. Watson, Simi Valley, all of Calif.

[73] Assignee: Aerovironment, Inc., Monrovia, Calif.

[21] Appl. No.: 583,477

[22] Filed: Sep. 17, 1990

Related U.S. Application Data

[63] Continuation-in-part of Ser. No. 519,015, May 4, 1990.

[51] Int. Cl.$^5$ .......................... B60V 1/11; B60V 1/14
[52] U.S. Cl. .............................. 180/117; 244/23 A; 244/23 D
[58] Field of Search ............... 180/116, 117, 118, 119, 180/120, 121, 123; 244/7 C, 12.4, 12.5, 21, 23 A, 23 D

[56] References Cited

U.S. PATENT DOCUMENTS

| | | | |
|---|---|---|---|
| 2,953,320 | 9/1960 | Parry | 180/117 |
| 3,700,189 | 10/1972 | Timperman | 244/12.4 |
| 4,795,111 | 1/1989 | Moller | 244/12.5 X |

Primary Examiner—Kenneth R. Rice
Assistant Examiner—Kevin Hurley
Attorney, Agent, or Firm—William W. Haefliger

[57] ABSTRACT

A flight system capable of passively stable hover and horizontal translatory flight, comprises an apparatus defining a vertical axis, and including multiple ducts with substantially vertical axes in hover mode, spaced the axis; fluid momentum generators in the ducts to effect flow of fluid downwardly in the ducts in hover; and fluid flow deflector structure in the path of the flowing duct fluid, and angled to deflect the fluid flow away from the axis, in such manner as to provide stability in hover of the apparatus, as well as stability when the entire device is tilted through approximately 90° to execute horizontal translatory flight.

22 Claims, 2 Drawing Sheets

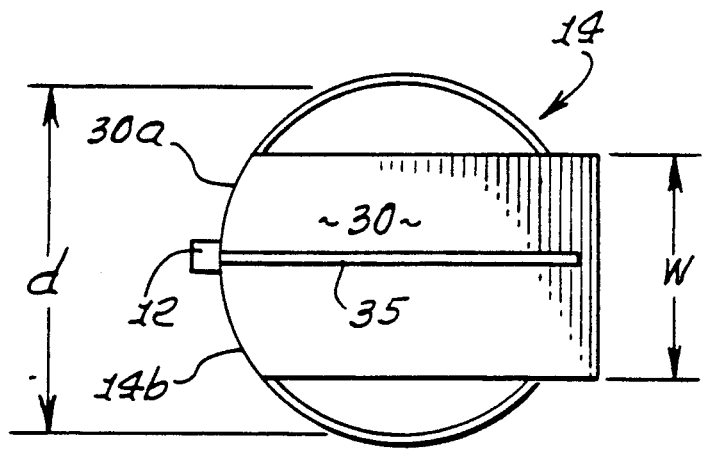
FIG. 3.
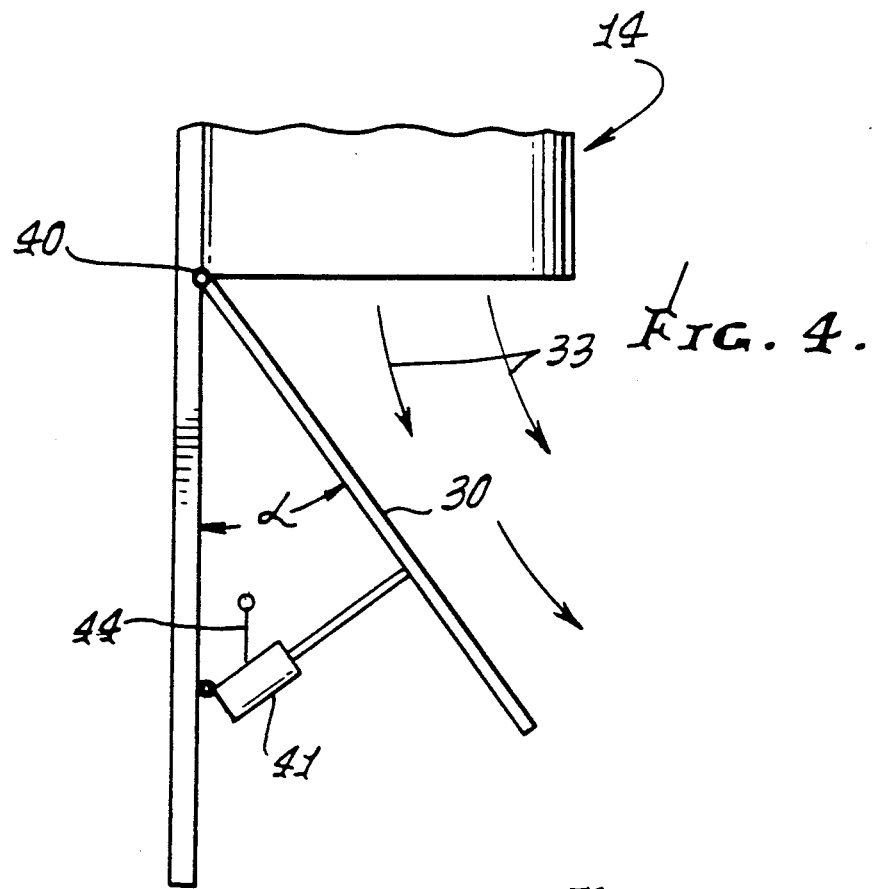
FIG. 4.
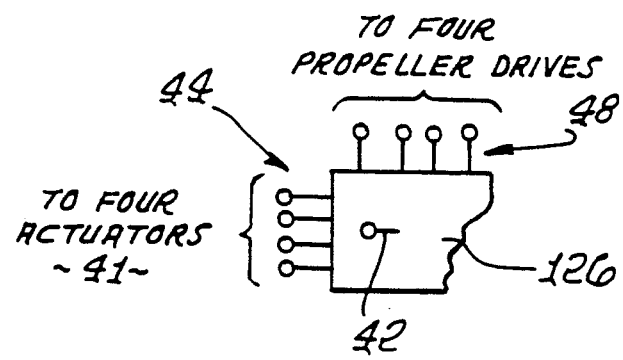

PASSIVELY STABLE HOVERING SYSTEM

This application is a continuation-in-part of Ser. No. 519,015 now pending filed May 4, 1990.

BACKGROUND OF THE INVENTION

This invention relates generally to devices operating in air or water, and more particularly, to devices that are essentially passively stable in hover, and in horizontal motion, i.e., self-stabilized against disturbances in any direction without need for active stabilizer mechanisms controlled by inertial or aerodynamic sensors through a general logic system, as in an autopilot.

Devices that can hover in air or water are needed for many military and commercial applications. Vertical axis propeller systems can normally provide the thrust required to support the weight of the device, but previous designs have proved to be naturally unstable, and have had to be stabilized by active stability systems controlled by inertial or aerodynamic sensors, as in autopilots. These autopilots usually incorporate motion sensors, such as accelerometers, gyroscopic sensors, complex electronic processing networks and mechanical actuators to provide the actions to create the necessary stabilizing moments.

There is need for a simple, passively stable, hovering device that eliminates the requirement for auxiliary, active stabilizer means, or autopilots, as referred to.

SUMMARY OF THE INVENTION

It is a major object of the present invention to provide a simple, efficient flight system that is passively stable in hover, and can also move horizontally at high speeds and is passively stable in horizontal flight, and which can operate in air or water. The air or water devices will involve different mechanizations to make allowance for the different properties of the two fluids, i.e., the specific structural design features will vary somewhat for air and water applications. Basically, the device comprises:

a) apparatus defining a vertical axis, and including multiple ducts having substantially vertical axes spaced about the axis, b) fluid momentum generator means in the ducts to effect flow of fluid downwardly in the ducts, c) and fluid flow deflector means in the path of the downwardly flowing fluid, and angled to deflect the fluid flow away from the axis, in such manner as to provide stability.

As will be seen, the ducts have lower exit nozzles, and the deflector means typically includes plates projecting downwardly and sidewardly, from and below the duct lower exit nozzles. For best results, the plates may be attached to, or extend from, the duct lower exit nozzles, and they may extend at angles between 30° and 60° relative to vertical.

The invention provides fluid momentum generator means, of which one form is that of propellers rotatable about axes coincident with the duct axes. The drives for the propellers may comprise electrical motor means, but other means may be utilized. A flexible, umbilical electrical cable may be connected with the motor means, or electrical battery means carried by the craft may be employed, or any other prime mover can be used to drive the propellers.

Further, the fluid momentum generators may be controlled in power or rotational speed, or by adjusting pitch of the rotor blades of the generator to provide control of moment or force about all three axes of motion.

Further, the deflector plates, for best results, may be substantially flat, with widths less than duct diameter; and for directional flight control purposes, the plates may be controllably hinged to the ducts.

These and other objects and advantages of the invention, as well as the details of an illustrative embodiment, will be more fully understood from the following specification and drawings, in which:

DRAWING DESCRIPTION

FIG. 3 is a bottom plan view taken on lines 3—3 of FIG. 2; and

FIG. 4 is a fragmentary side elevation of one air flow duct, of a group of same, with a controllable deflector plate.

DETAILED DESCRIPTION

Figure 1:
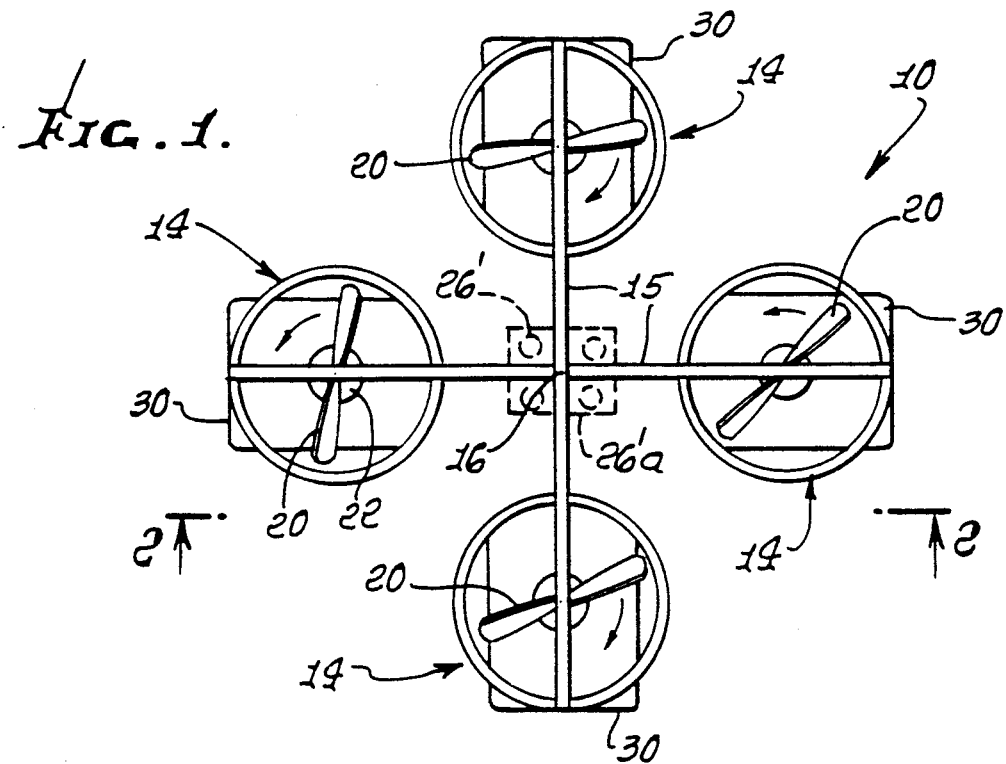
FIG. 1 is a top plan view of one form of apparatus incorporating the invention.
Figure 2:
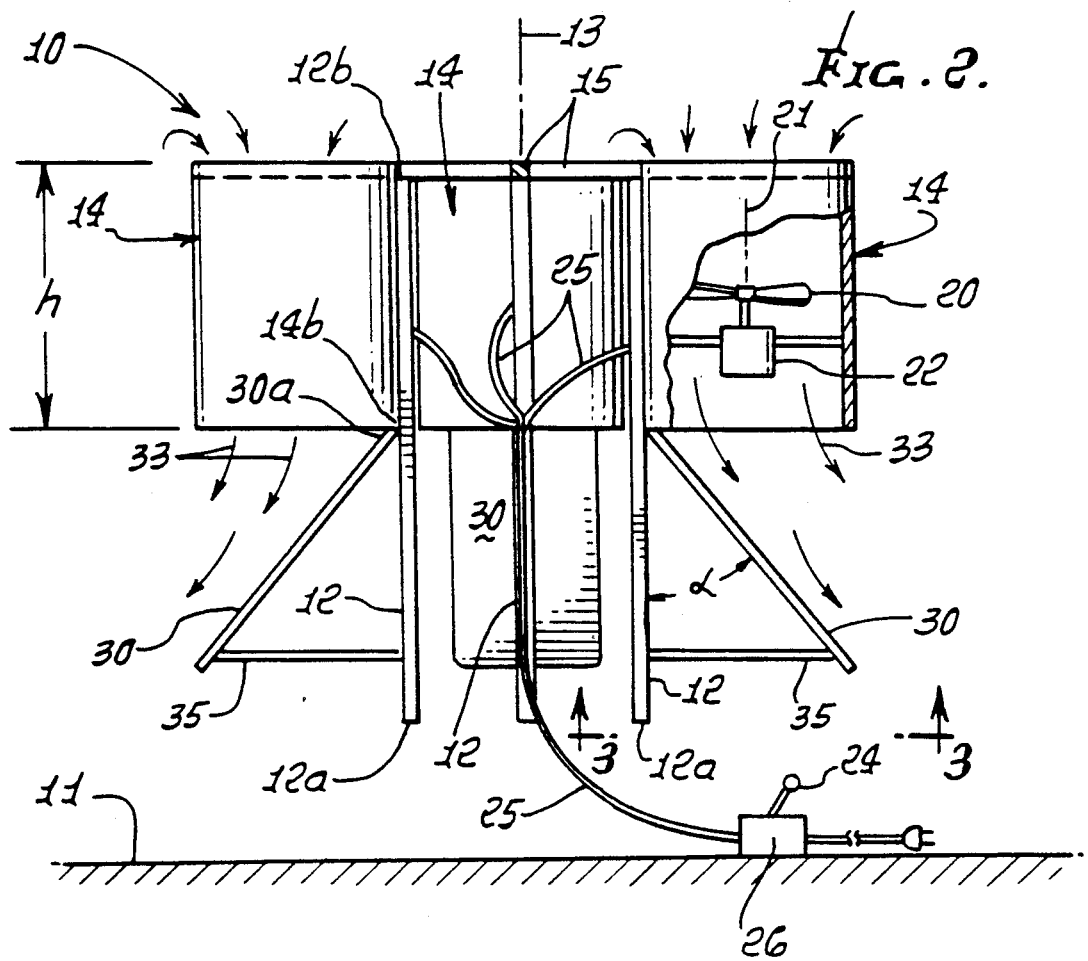
FIG. 2 is an elevation taken on lines 2—2 of FIG. 1.

In FIGS. 1–3, the passively stable hovering and free flight system 10 is shown in stable hovering position at a selected elevation above a surface 11. The system or apparatus 10 may have risen from surface to selected elevation. Merely as illustrative, the apparatus may include support means adapted to engage the surface 11 prior to lift-off, such support means shown as multiple vertical struts 12 having lower ends or feet at 12a.

The apparatus 10 defines a vertical axis 13, and includes multiple upright ducts 14 spaced about that axis, as for example at equal angular intervals. Four such ducts are illustrated, but three or more may be utilized. The ducts may typically be cylindrical, and do not require equal inner diameters "d" and lengths or heights "h". Suitable structure interconnects the ducts to position them, and such structure is shown to include horizontal struts or members 15 joined at center 16. Vertical struts 12 are shown as having their uppermost extents 12b joined to the members 15. Struts 12 extend adjacent the outer sides of the ducts closest to axis 13, and may be joined to the ducts to enhance apparatus strength. Other member and strut, or structure, configurations are possible.

In accordance with the invention, fluid momentum generator means is provided in the ducts to effect flow of fluid downwardly in and through the ducts. Such fluid momentum generator means is shown in the example to comprise propellers 20 rotatable about central vertical axes 21 in the ducts, i.e., substantially coincident with the duct axes. Drive means is or are provided to rotate the propellers, and may, for example, comprise suitably supported electric motors 22 driving the propellers. For an electrical system, power can be supplied to the motors, as from a controllable power source 26 (see manual control 24) and via a flexible electrical "umbilical" cable or cables 25. In case electrical batteries are used, they may be carried directly by the hovering apparatus. (Broken lines 26' in FIG. 1 indicate the possible position of such batteries in a pack 26'a.) Internal combustion engine means can be used as a drive for the propellers.

Further, in accordance with the invention, fluid flow deflector means is provided in the path of the downwardly flowing fluid, and angled to deflect the fluid flow away from said axis, in such manner as to provide stability. See arrow 33.

For best results, the deflector means include flat plates 30, or plate surfaces, that project downwardly and sidewardly from and below duct lower exit nozzle 14*b* closest to the central axis 13, and at angles α relative to vertical. Angle α is between 30° and 60° for best results in terms of craft stability. The plates project downwardly away from axis 13.

The plates typically have width "w" less than the duct diameter d, i.e., w<d. If w>d, hover flight stability also occurs. Upper ends 30*a* of the plates may be connected to the lower end portions 14*b* of the ducts, as shown. Stability is affected if the plate upper ends do not extend closely proximate the ducts. Lower or intermediate extents of the plates may be connected to struts 12, as via brace members 35.

Following these principles, a craft can be constructed to exhibit passive stability while hovering and in high speed horizontal flight. Manual control 24 at power source 26 is adjustable to change electrical power delivered to the propeller drives for one method of altitude control.

FIG. 4 shows a modification wherein the plates 30 are pivot or hinge connected to the duct lower ends, as at pivot locations 40. Actuators 41 are connected to the plates to control their angle α, and thereby control craft flight direction. A joystick 42 at power source 126 is one of many methods available to control power to the actuators to control flight attitude and direction. The joystick 42 may alternatively control power or propeller pitch to the four propeller drives or deflector angle, via cables 44 and 48, to vector and control duct thrust for flight direction control in any direction. The device may also be operated in free flight with no control or autopilot stabilizing systems or by utilizing radio to transmit control signals to the device.

When operating in the atmosphere, the fluid described herein consists of air; and when operating in liquid, the fluid typically consists of water.

I claim:

1. In a passively stable hovering system, the combination comprising:
   a) apparatus defining a principle central axis in hover mode, and including multiple upright ducts spaced about said axis, said ducts having central axes, parallel to said apparatus principle central axis,
   b) multiple fluid momentum generators, at least one in each of said ducts to effect axial flow of fluid downwardly in the ducts,
   c) and fluid flow deflector means extending in flow deflecting relation with said axially flowing fluid, and angled to deflect the fluid flow away from said central axis, in such manner as to provide stability,
   d) said ducts having exit nozzles and said deflector means projecting outwardly from the central axis and below each of said duct exit nozzles, respectively.

2. The combination of claim 1 wherein said deflector means comprise plates projecting axially downwardly and outwardly, from and below said duct exit nozzles, and away from said central axis.

3. The combination of claim 2 wherein said plates are attached to the duct exit nozzles.

4. The combination of claim 3 wherein the plates extend at angles between 30° and 60° relative to said central axis.

5. The combination of claim 2 wherein said plates are substantially flat.

6. The combination of claim 2 wherein each of said plates has width less than the diameter of each associated duct.

7. The combination of claim 2 wherein said plates are supported to have controllable angularly relative to said central axis and including control means for controlling said angularity.

8. The combination of claim 1 including control means connected with said multiple generators to differentially control operation thereof for flight direction control.

9. The combination of claim 1 wherein there are at least three of said ducts symmetrically located about said central axis.

10. The combination of claim 1 wherein said momentum generators comprise rotatable about axes substantially coincident with duct axes.

11. The combination of claim 10 including drive means for rotating the propellers.

12. The combination of claim 11 wherein said drive means comprises at least one electric motor operatively connected with said propellers.

13. The combination of claim 12 including electrical cable means connected with said drive means to controllably supply electrical energy thereto.

14. The combination of claim 11 wherein said drive means comprises internal combustion engine means connected with the propellers.

15. The combination of claim 11 wherein said drive means includes at least one motor carried by said apparatus and operatively connected with said propellers.

16. In a passively stable hovering system also capable of stable horizontal flight, the combination comprising:
   a) apparatus defining a principle central axis in hover mode, and including multiple ducts spaced about said axis, said ducts having central axes, substantially parallel to said apparatus principle central axis,
   b) multiple fluid momentum generators, at least one in each of said ducts to effect axial flow of fluid downwardly in the ducts,
   c) and fluid flow deflector means extending in flow deflecting relation with said axially flowing fluid, and angled to deflect the fluid flow away from said central axis, in such manner as to provide stability in hover and in horizontal flight,
   d) each said duct having an exit nozzle and said deflector means comprising plates each projecting outwardly of the central axis and below one of said duct exit nozzles.

17. The method of operating a passively stable hovering system, the system having a principle central axis in hover mode, multiple upright ducts spaced about said principle axis and having central axes and exit nozzles, and multiple momentum generators, at least one in each of said ducts to effect axial flow of fluid downwardly in the ducts, the method including:
   a) providing fluid flow deflector means to combine plates extending in flow deflecting relation with said axially flowing fluid,
   b) angling said plates to deflect the fluid flow away from said central axis, in such manner as to provide stability in hover and in horizontal flight,
   c) and further locating said flow deflector plates to project outwardly from the central axis and below each of said duct exit nozzles, respectively.

18. The method of claim 17 including orienting said plates to project axially downwardly and outwardly, from and below said duct exit nozzles, and away from said central axis.

19. The method of claim 18 including controlling at least one of said momentum generators and said flow deflector means to control fluid flow discharge from the ducts to achieve directed flight with a horizontal component.

20. The method of claim 18 including supporting said plates to have controllable angularity relative to said central axis, and including providing and operating control means for controlling said angularity.

21. The combination of claim 17 wherein said momentum generators comprise propellers rotatable about axes substantially coincident with axes defined by the ducts, and drive means for rotating the propellers, and including controlling said drive means to achieve directed flight, with a horizontal component.

22. The method of claim 17 including providing at least three of said ducts symmetrically located about said apparatus central axis.

* * * * *